June 24, 1924.
W. L. FRANCE
BULB HOLDER
Filed April 14, 1922
1,499,165
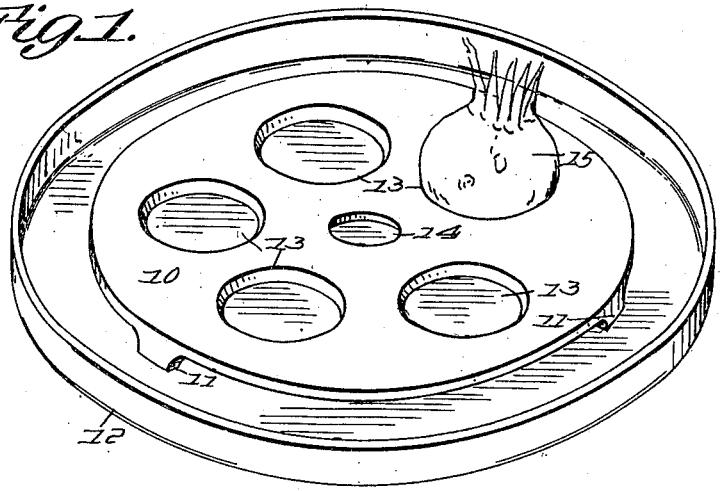
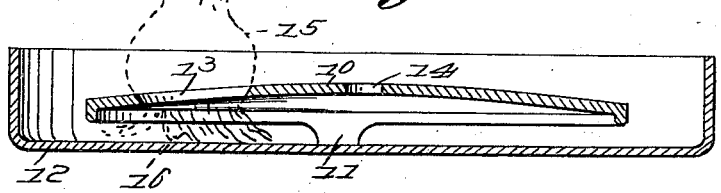
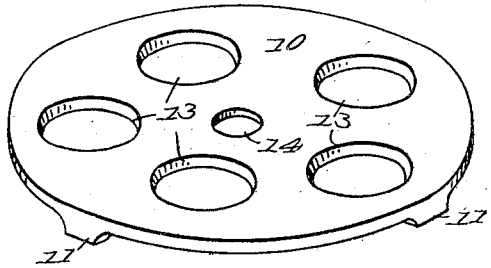
Inventor
Wade L. France,
By
Attorney Patented June 24, 1924.

1,499,165

UNITED STATES PATENT OFFICE.

WADE L. FRANCE, OF ZANESVILLE, OHIO.

BULB HOLDER.

Application filed April 14, 1922. Serial No. 552,577.

*To all whom it may concern:*

Be it known that WADE L. FRANCE, a citizen of the United States of America, residing at Zanesville, in the county of Muskingum and State of Ohio, has invented new and useful Improvements in Bulb Holders, of which the following is a specification.

The object of the invention is to provide a sanitary receptacle for use in the propagation and development of plants of the bulbous variety ordinarily used for ornamental or decorative purposes particularly in households, nurseries and the like and which depend for their sustenance upon moisture usually supplied by embedding the bulbs in moist sand or gravel in a suitable bowl or container; and more particularly to provide a receptacle or holder for the purpose indicated which can readily be cleansed and supplied with fresh water at short intervals sufficient to prevent the stagnation and distribution of an offensive odor without disturbing or injuring or disarranging the roots or tendrils of the bulbs; and with these objects in view the invention consists in a construction and combination of parts of which a preferred embodiment is shown in the accompanying drawings, wherein:—

Figure 1 is a view of a bulb holder embodying the invention arranged in the operative position in a suitable bowl or receptacle.

Figure 2 is a sectional view of the same.

Figure 3 is a view of the holder detached.

The holder consists of a disk 10 of pottery or other suitable material having depending supporting legs or feet 11 and adapted to bear upon the bottom of a containing vessel such as the bowl 12 which also may be of pottery or other suitable ware, said disk having a plurality of seats 13 preferably consisting of round openings arranged in a series or distributed in any suitable or ornamental way with reference to the surface of the disk, with a sanitary finger hole 14 serving as a means whereby the holder may readily be grasped by the finger of the operator to carry the holder or place the same in or remove the same from the bowl or receptacle without touching or disturbing either the bulbs of which the body portions are located above the plane of the disk and are indicated at 15, or the roots or sprouts 16 which extend below the disk and are thereby submerged in the water contained in the bowl or receptacle.

Obviously the seats may consist of openings of any desired dimensions to suit the size and character of the bulbs to be supported and the disk may be made of any desired diameter or peripheral contour to suit the size and shape of the receptacle or bowl in which the same is to be used, and in practice the roots or sprouts of the bulb are disposed entirely beneath the plane of the disk forming the bulb supporting table or rest, so as to be concealed from view when the holder is in place in the bowl while having free access to the liquid contents of the latter.

In the growth of the bulbs the roots or sprouts which in connection with healthy bulbs are numerous and vigorous, become interlaced and matted so as to serve as an efficient means of holding the bulbs in the seats of the holder during the movement of the holder such as its removal from the bowl to permit of the emptying of stale water and a replacing of the same by fresh water, and such removal can be effected obviously without disturbing the roots or sprouts and hence without injury thereto or tendency to retard the growth of the bulbs, and the roots may furthermore be thoroughly rinsed as by inversion and subjection to running water, to remove any deposit or accumulation of foreign material thereon, without injury which is the objection to developing the bulbs in a bed of sand or gravel or its equivalent which becomes engaged with the roots or sprouts and tends to carry or retain slime serving to give forth a stale or unpleasant odor.

In other words a holder such as described provides for the thorough cleansing of the device including the bowl or receptacle in which it is placed at short intervals sufficient to prevent the objectionable accumulation of foreign matter or the stagnation of the water to an extent sufficient to give off an offensive odor, whereas such cleansing or sterilizing is impossible where the bulbs are bedded on sand or gravel or the like and where any attempt to effect a thorough cleansing can not result otherwise than in injuring to some extent the delicate sprouts and tendrils which are essential to the healthy development of the bulbs.

Having described the invention, what is claimed as new and useful is:—

A bulb holder comprising an arched pottery disk having depending feet adapted to bear upon the bottom of a containing vessel, said disk being formed with uniformly spaced circular openings large enough for the reception of bulbs of which the body portions are disposed above the plane of the disk and the roots extended below for submersion in the water of the containing vessel.

In testimony whereof he affixes his signature.

WADE L. FRANCE.